United States Patent [19]

Haltbrekken

[11] Patent Number: 4,776,532
[45] Date of Patent: Oct. 11, 1988

[54] RESCUE EQUIPMENT TO BE USED IN THE PASSENGER CABIN OF A VESSEL

[76] Inventor: Kjell Haltbrekken, Ingebjorgs vei 7, N-7140 Opphaug, Norway

[21] Appl. No.: 10,679

[22] Filed: Feb. 4, 1987

[30] Foreign Application Priority Data

Feb. 5, 1986 [NO] Norway ............................... 860397

[51] Int. Cl.$^4$ ............................................. B64D 25/00
[52] U.S. Cl. ............................. 244/118.5; 244/137.2; 182/230
[58] Field of Search ............... 244/118.1, 118.5, 137.2; 182/230, 18, 3

[56] References Cited

U.S. PATENT DOCUMENTS

| | | | |
|---|---|---|---|
| 2,722,696 | 11/1955 | Johnson | 441/84 |
| 3,408,025 | 10/1968 | Davis | 182/230 |
| 4,179,160 | 12/1979 | Sabo | 182/230 |
| 4,347,499 | 8/1982 | Burkman, Sr. et al. | 182/18 |
| 4,557,442 | 12/1985 | Krezak et al. | 244/137.2 |

*Primary Examiner*—Galen Barefoot
*Assistant Examiner*—Lynn M. Fiorito
*Attorney, Agent, or Firm*—Pollock, Vande Sande & Priddy

[57] ABSTRACT

For rescue equipment in a passenger cabin in a vessel especially a helicopter in case of an emergency landing at sea, a line is provided floatable in water and extending to a cabin exit (13), preferably to an exit at each end of the cabin. The floating line is attached to the cabin ceiling (11) by anchoring lines (15) distributed along the length of the floatable line (14).

7 Claims, 3 Drawing Sheets

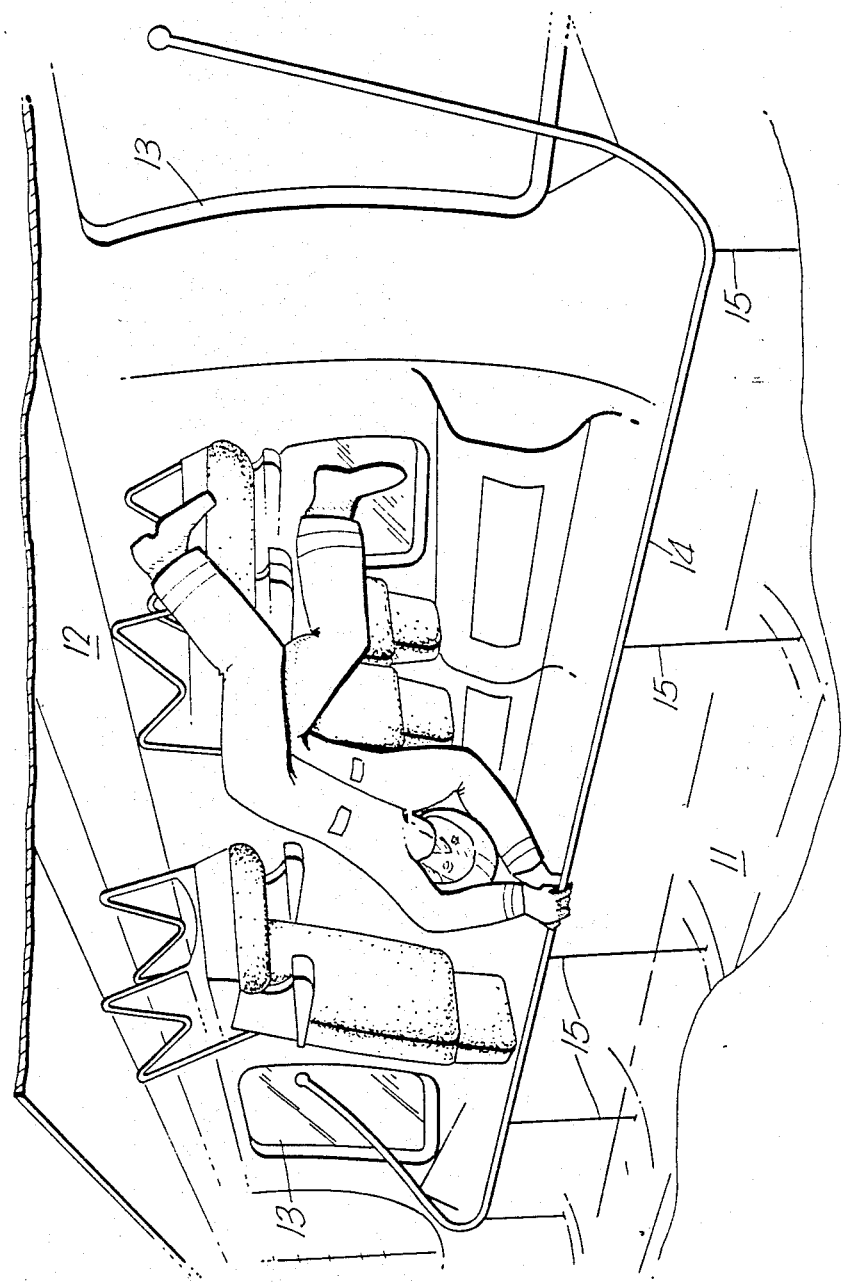

RESCUE EQUIPMENT TO BE USED IN THE PASSENGER CABIN OF A VESSEL

BACKGROUND OF THE INVENTION

The present invention relates to resque equipment to be used in the passenger cabin of a vessel, especially in helicopters, comprising a guide means, which persons may grasp and follow to an exit.

From U.S. Pat. No. 4,557,442 it is known to use guide ropes in aircraft. From U.S. Pat. Nos. 2,396,039 and 3,408,025 it is known that passengers may use the edge of the luggage rack as a grip when they move. From U.S. Pat. No. 3,408,025 it is known to provide a luggage rack with a ribbon guiding towards the closest exit. None of these known means are quite satisfactory, especially in connection with helicopters.

Experience shows that when helicopters make an emergency landing at sea, the helicopter in most cases will capsize. Due to this knowledge there is, to day, a standard procedure to be used by helicopter crews in case of an emergency landing at sea. This procedure involves use of a guiding/leading hand, i.e. at the moment of ditching—emergency landing—the crew members will open the emergency exits or doors and, if possible, hold one arm out and down along the outside of the fuselage. If the crew manages to get out before the helicopter rolls over, all is well. If not, the crew will remain seated and strapped in their seats until the helicopter has come to rest and the cabin has been flooded. Each crew member will then unbuckle the safety belt and pull himself out of the helicopter by the guiding hand, which has been kept outside the cabin all the time, if that is possible. For well trained helicopter crews who know the aircraft and their own personal emergency equipment, and trust it, such an emergency procedure proved to be quite successful.

Problems will, however, arise if, for instance, a 20 passenger helicopter carrying offshore personnel makes an emergency landing at sea. Such an emergency situation will not just involve a well trained crew, but passengers who might even be on their first helicopter flight and wear their survival suits for the first time. Without a leading hand or an extended leading hand very few of these people will manage to get out of a helicopter rolled over with the bottom up and with the cabin flooded with cold sea water. Panic might quickly spread and be enhanced because in such a chaotic situation people will not know which way to go to the exit. A negative element in this connection is, in fact, also that the passengers are required to wear their survival suits which, due to considerable buoyancy will force the passengers up against the cabin floor. If the ditching occurs in the evening or at night, the situation is, obviously, even worse.

SUMMARY OF THE INVENTION

The present invention is based on the knowledge of these problems related to guiding hand procedure and it is an object of the invention to provide what might be called an extended guiding hand, that is not based on a special effort from the crew.

According to the present invention rescue equipment is, thus, proposed including guiding means in a form of a guide line that will float in water and extends to a cabin exit, preferably one exit at each end, and that is connected to the cabin ceiling of the vessel by anchoring lines distributed along the line and each having a length enabling persons sitting in the cabin to reach them and grip them when it is necessary/desired to use them.

In case of ditching or emergency landing at sea the crew is directed to grasp the floating line with one hand, while the other hand is, advantageously, gripping the buckle of the safety belt. The floating line is arranged in such a manner that passengers who do not grip it, or may have lost contact, will be able to reach it, even though they may be forced up towards the cabin floor because of the buoyancy. In the more or less flooded cabin passengers will be able to pull along in the correct direction, i.e. towards an exit, along the line. If the bottom of a ditched helicopter is undamaged, the machine will float for quite a long time and, usually, for a sufficiently long time to let the passengers get out if only they know which way to go.

Advantageously, the floating line is kept in a position of readiness, secured to the cabin ceiling by quick release fastening means. Such fastening means may be activated by remote control or they may be locally releasable means. In case of a ditching the line is released by the crew or by the crew and/or the passengers.

The anchoring lines are kept out of the way in a position of readiness, and an advantageous embodiment is characterized by the fact that the anchoring lines are rigid to permit pulling/pushing, and in their position of readiness, they are inserted into guide tubes provided adjacent to the ceiling of the cabin, preferably inside the frame structure of the cabin. When the floating line is activated, anchoring lines will be pulled out of their respective guide tubes, a holding means being provided at the free end of each anchoring line causing the anchoring line to hook up in the guide tube at the opening of the guide tube in the cabin. Such an embodiment also permits simple testing of the rescue equipment, since, after testing, the anchoring lines can in a simple manner be pushed into said guide tubes again, said anchoring lines being rigid, and the floating line can be secured to the ceiling by means provided to this end.

An especially advantageous embodiment is characterized by the fact that the floating line is luminiscent or marked in another manner with increased intensity towards the exits. Passengers and crew will then receive a clear indication of the direction in which they should move along the floating line. This might be critical in a dark and flooded cabin where everything is literally upside-down.

The present invention is obviously not limited to cabins in helicopters as regards its application. It may be used in other vessels, e.g. regular aircraft, and it is possible to use such equipment in ships as well as in vehicles, e.g. motor coaches, etc.

The invention is now disclosed in more detail with reference to the drawings, wherein

BRIEF DESCRIPTION OF THE DRAWINGS

FIG. 4 shows a portion of a helicopter cabin in perspective and in an upside-down and flooded state.

DESCRIPTION OF THE PREFERRED EMBODIMENTS

Figure 1:
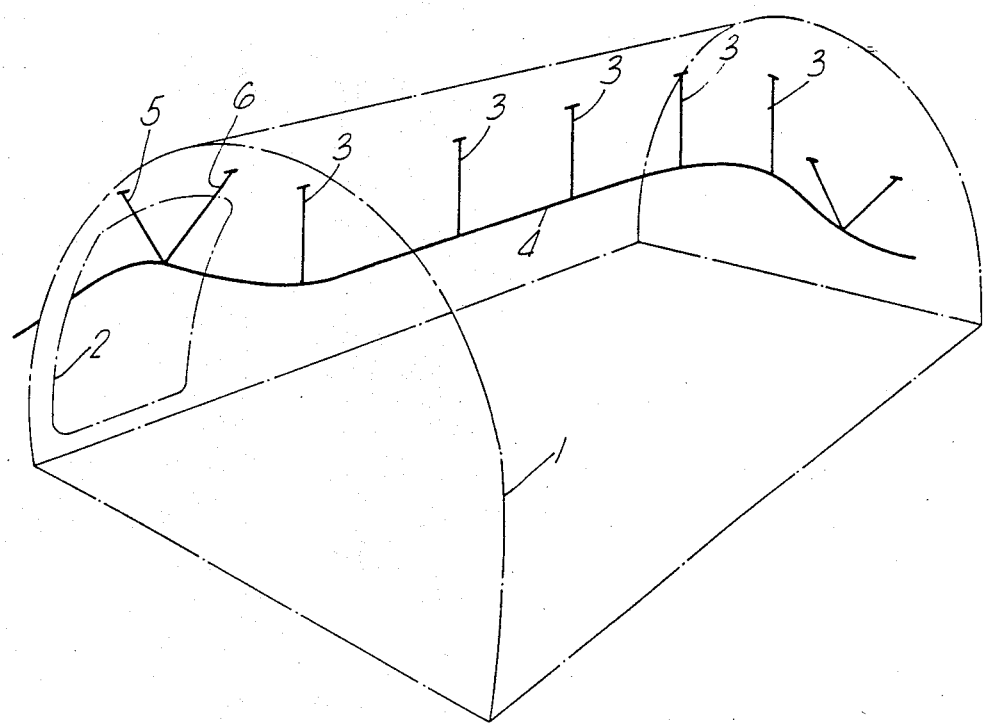
FIG. 1 is a diagrammatical view of a passenger cabin in a vessel provided with rescue equipment according to the present invention.

In FIG. 1 a passenger cabin 1 in a non-specified vessel is diagrammatically shown. The cabin has an exit 2. A floating line 4 is suspended from the cabin ceiling by the aid of anchoring lines 3. Near the exit the floating line 4 is suspended from anchoring lines 5 and 6. Passengers in cabin 1 can grasp floating line 4 and pull themselves or move along line 4 to exit 2.

Figure 2:
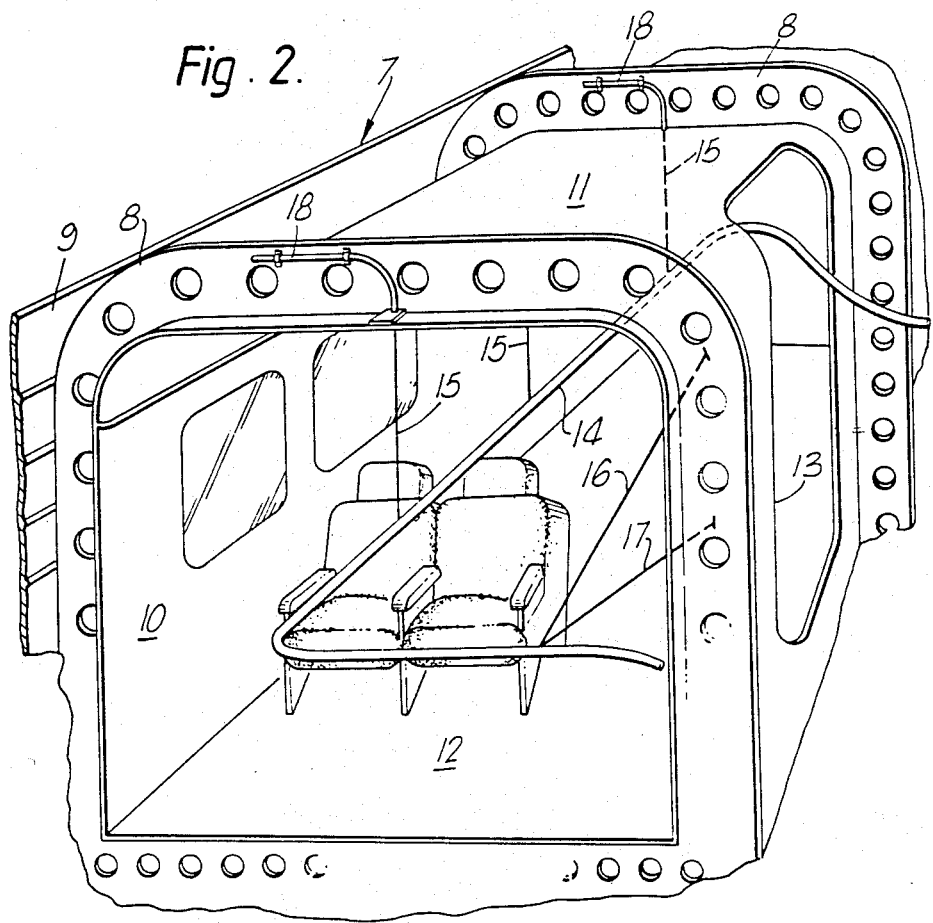
FIG. 2 is a diagrammatical view in perspective of a helicopter cabin, partly shown in section, and provided with rescue equipment according to the present invention.
Figure 3:
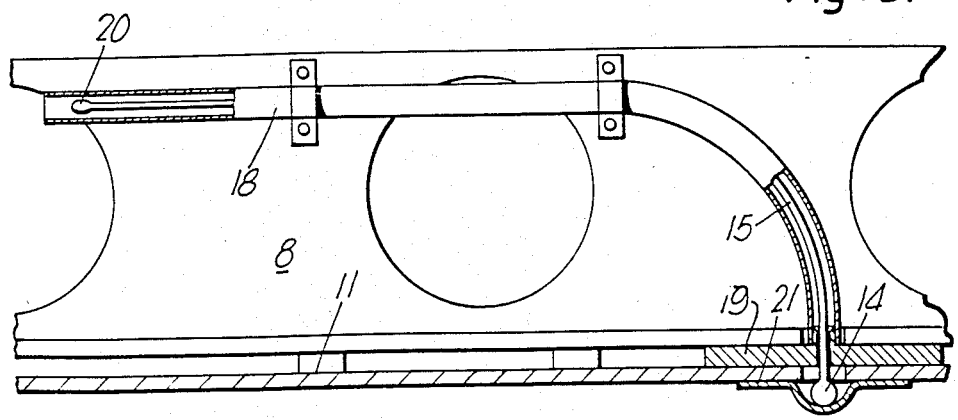
FIG. 3 shows a detail from FIG. 2.

In FIGS. 2 and 3 a practical embodiment of the rescue equipment is shown in more detail. In FIG. 2 a helicopter cabin 7 is shown, partly in section. Cabin 7 is built in a conventional manner with frames 8, exterior skin 9, and interior covering 10. The ceiling of the cabin is designated 11, and the floor of the cabin is designated 12. A cabin exit is designated 13.

A floating guide line according to the present invention is designated 14 and is suspended in anchoring lines 15. Floating line 14 extends out through exit 13, as shown by dotted lines, and its front portion, shown in FIG. 2, extends to another exit, not shown. At the exit floating line 14 is anchored by the aid of anchoring lines 16, 17. The rescue equipment, thus, has the same structure, in principle, as that shown in FIG. 1.

Anchoring lines 15 are rigid to permit them being pulled or pushed. In the position of readiness of floating line 14 with the floating line placed closely beneath cabin ceiling 11, anchoring lines will be inserted in respective guide tubes 18 (see FIG. 3). At the end close to ceiling covering 11 guide tube 18 is attached to a fastening plate 19, which is fastened to frame 8 in a suitable manner. Anchoring line 15 is passed through a bore in plate 19 and into guide tube 18. At the free end of anchoring line 15 it is provided with a suitable enlargement, e.g. a steel ball 20. Floating line 14 is held in contact with cabin ceiling 11 by the aid of tape 21.

When floating line 14 is to be moved into an operating position it is sufficient simply to grasp it with one hand an pull it down. Tape 21 will then break or lose its adhesion to ceiling 11. Anchoring line 15 is pulled out of its respective guide tube 18 until ball 20 abuts against plate 19 and, thus, stops the pulling movement of floating line 14. The conditions will then be as shown in FIG. 2. Anchoring lines 16 and 17 may also, advantageously, extend in guide tubes as mentioned above.

FIG. 4 shows the situation in the cabin of FIG. 2 after the helicopter has rolled to an upside-down position in the sea and the cabin is flooded with water. The floating line 14 will tend to move upwards due to its buoyancy and will reach a position permitting the shown person to grasp floating line 14, even though the person is forced upwards floor 12 due to buoyancy. The person may then move along line 14 towards one of the exits 13. As mentioned, line 14 is marked in a suitable manner, e.g. with a fluorescent paint showing increasing intensity towards the exits.

I claim:

1. A rescue equipment for use in a passenger cabin of a vessel, especially a helicopter, during an emergency landing at water comprising:
    a guide means which persons may grasp and follow to a cabin exit of the passenger cabin, said guide means including a line floatable in water and extending to the cabin exit, preferably to one exit at each end of the cabin, said floatable line being attached to the cabin ceiling by anchoring lines which are distributed along the length of said floatable line, said floatable line being maintained in a non-emergency position in a location close to the cabin ceiling by releasable fastening means, and upon actuation is pullable to be held away from said ceiling by said anchoring lines in an emergency position, each of said anchoring lines having such a length that said floatable line may be easily accessable for use by the persons in the cabin.

2. A rescue equipment according to in claim 1, wherein said fastening means is locally releasable.

3. A rescue equipment according to claim 1, further comprising guide tubes placed closely below the cabin ceiling, said anchoring lines being rigid and slidable inside said guide tubes by pulling/pushing between said non emergency and emergency positions.

4. A rescue equipment according to claim 3, wherein each of said anchoring lines includes means for restraining a free, slidable end of said anchoring line in said guide tube in said emergency position.

5. A rescue equipment according to claim 4, wherein said floatable guide line is translucent.

6. A rescue equipment according to claim 4, wherein said flotable line is visably marked with increasing intensity towards the exits.

7. A rescue equipment according to claim 3, wherein said anchoring line is fully inserted into said guide tube in said non-emergency position.

* * * * *